United States Patent
Gokhale et al.

(10) Patent No.: US 10,196,993 B2
(45) Date of Patent: Feb. 5, 2019

(54) SYSTEM AND METHOD FOR OPERATING A TURBOCHARGED ENGINE

(75) Inventors: Manoj Prakash Gokhale, Bangalore (IN); Madhuri Gandikota, Pune (IN)

(73) Assignee: GE Global Sourcing LLC, Norwalk, CT (US)

( * ) Notice: Subject to any disclaimer, the term of this patent is extended or adjusted under 35 U.S.C. 154(b) by 1494 days.

(21) Appl. No.: 12/555,043

(22) Filed: Sep. 8, 2009

(65) Prior Publication Data

US 2011/0056199 A1    Mar. 10, 2011

(51) Int. Cl.
*F02D 41/00*        (2006.01)
*F02B 33/44*        (2006.01)
(Continued)

(52) U.S. Cl.
CPC ............ *F02D 41/005* (2013.01); *F02B 33/44* (2013.01); *F02B 37/16* (2013.01); *F02B 39/16* (2013.01); *F02D 35/023* (2013.01); *F02D 41/0007* (2013.01); *F02D 41/1466* (2013.01); *F02D 41/401* (2013.01); *F02M 26/05* (2016.02); *F02M 26/45* (2016.02); *F02B 29/0425* (2013.01); *F02B 29/0437* (2013.01); *F02D 41/146* (2013.01); *F02D 2200/0414* (2013.01); *F02D 2200/602* (2013.01); *F02D 2200/703* (2013.01); *F02M 26/16* (2016.02); *F02M 26/23* (2016.02); *F02M 26/34* (2016.02);
(Continued)

(58) Field of Classification Search
CPC ................. F02D 41/005; F02D 35/023; F02D 2200/703; F02M 25/0722; F02M 25/0707; Y02T 10/144

USPC ........ 60/600–602, 605.2; 123/568.11, 568.2; 701/108
See application file for complete search history.

(56) References Cited

U.S. PATENT DOCUMENTS 5,141,391 A * 8/1992 Acton et al. .................. 415/119
6,055,808 A * 5/2000 Poola et al. .................... 60/274
(Continued)

FOREIGN PATENT DOCUMENTS

EP       1138928 A2     10/2001
EP       1398483 A2      3/2004
(Continued)

OTHER PUBLICATIONS

Unofficial English translation of Office Action issued in connection with corresponding CN Application No. 201080050522.2 dated Nov. 7, 2013.

*Primary Examiner* — Mark Laurenzi
*Assistant Examiner* — Jason Sheppard
(74) *Attorney, Agent, or Firm* — McCoy Russell LLP

(57) ABSTRACT

A method includes substantially eliminating surge of a compressor and reducing specific fuel consumption and exhaust emissions of an engine by adjusting exhaust flow through an exhaust gas recirculation system, by adjusting airflow through a compressor recirculation valve, by adjusting fuel injection timing, or by adjusting a combination thereof in response to variance in a plurality of parameters. The parameters include quantity of exhaust emissions, a maximum in-cylinder pressure of the engine, an area ratio of an exhaust gas recirculation mixer of the exhaust gas recirculation system, estimated or sensed compressor surge, engine load, altitude of operation, or combinations of the parameters thereof.

25 Claims, 3 Drawing Sheets

(51) Int. Cl.

| | | |
|---|---|---|
| *F02B 37/16* | (2006.01) | |
| *F02B 39/16* | (2006.01) | |
| *F02D 35/02* | (2006.01) | |
| *F02D 41/40* | (2006.01) | |
| *F02M 26/05* | (2016.01) | |
| *F02M 26/45* | (2016.01) | |
| *F02B 29/04* | (2006.01) | |
| *F02D 41/14* | (2006.01) | |
| *F02M 26/16* | (2016.01) | |
| *F02M 26/23* | (2016.01) | |
| *F02M 26/34* | (2016.01) | |

(52) U.S. Cl.
 CPC ............. *Y02T 10/144* (2013.01); *Y02T 10/44* (2013.01); *Y02T 10/47* (2013.01)

(56) References Cited

U.S. PATENT DOCUMENTS

| | | | |
|---|---|---|---|
| 6,286,480 B1 | 9/2001 | Chen et al. | |
| 6,601,388 B1* | 8/2003 | Gladden | 60/606 |
| 6,871,498 B1* | 3/2005 | Allen et al. | 60/608 |
| 7,080,511 B1 | 7/2006 | Bolton et al. | |
| 7,089,738 B1* | 8/2006 | Boewe et al. | 60/605.2 |
| 7,281,378 B2 | 10/2007 | Gu et al. | |
| 7,353,811 B2 | 4/2008 | Weisz | |
| 7,529,614 B1 | 5/2009 | Muller | |
| 7,685,815 B2* | 3/2010 | Gudorf | 60/295 |
| 2003/0144788 A1* | 7/2003 | Brackney et al. | 701/103 |
| 2006/0212140 A1* | 9/2006 | Brackney | 123/568.21 |
| 2006/0288702 A1 | 12/2006 | Gokhale et al. | |
| 2007/0023018 A1 | 2/2007 | Berggren | |
| 2007/0095063 A1* | 5/2007 | Mischler et al. | 60/608 |
| 2009/0077968 A1 | 3/2009 | Sun | |
| 2009/0223218 A1* | 9/2009 | Winsor et al. | 60/605.2 |
| 2011/0088674 A1* | 4/2011 | Shutty et al. | 123/568.21 |

FOREIGN PATENT DOCUMENTS

| | | |
|---|---|---|
| WO | 2006104798 A1 | 10/2006 |
| WO | 2006127794 A2 | 11/2006 |
| WO | 2006137279 A1 | 12/2006 |

* cited by examiner

SYSTEM AND METHOD FOR OPERATING A TURBOCHARGED ENGINE

BACKGROUND

The invention relates generally to a system and method for operating a turbo-charged compression-ignition engine and, more specifically, to a system and method for substantially eliminating compressor surge and reducing specific fuel consumption and engine exhaust emission in a turbo-charged engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide, nitrogen oxides (NOx), particulate matter (PM), and smoke generated due to incomplete combustion of fuel within the combustion chamber. The amount of these pollutants varies depending on the fuel-air mixture, compression ratio, injection timing, ambient conditions, and so forth.

Stringent emission regulations have forced emissions from engines to reduce over the years. One of the emissions of concern is nitrogen oxide (NOx) emissions. Exhaust gas recirculation is one of the potential ways to achieve low NOx emission levels. As the percentage of exhaust gas recirculation increases, lower NOx emission levels become achievable. In such a high-pressure exhaust gas recirculation system, the turbo compressor can surge in different situations. In one situation, as the percentage of exhaust gas recirculation increases, the fresh air needed by the engine reduces. This leads to a reduced flow in the compressor, leading the compressor to a surge condition. In another situation, as the throat area of an exhaust gas recirculation mixer disposed proximate to an intake manifold of the engine decreases, the backpressure on the compressor increases, decreasing the pressure ratio across the compressor leading the compressor to a surge condition.

It is desirable to have a system and method for substantially eliminating compressor surge and reducing specific fuel consumption and engine exhaust emission in a turbo-charged engine.

BRIEF DESCRIPTION

In accordance with an exemplary embodiment of the present invention, a method of operating a turbocharged engine system is disclosed. The method includes substantially eliminating surge of a compressor and reducing specific fuel consumption and exhaust emissions of an engine by adjusting exhaust flow through an exhaust gas recirculation system, by adjusting airflow through a compressor recirculation valve, by adjusting fuel injection timing, or by adjusting an area ratio of an exhaust gas recirculation mixer of the exhaust gas recirculation system, or by adjusting a combination thereof in response to variance in a plurality of parameters. The parameters include quantity of exhaust emissions, a maximum in-cylinder pressure of the engine, an area ratio of an exhaust gas recirculation mixer of the exhaust gas recirculation system, estimated or sensed compressor surge, engine load, altitude of operation, or combinations of the parameters thereof.

In accordance with another exemplary embodiment of the present invention, a system includes a controller configured to substantially eliminate surge of a compressor and reduce specific fuel consumption and exhaust emissions of an engine by adjusting exhaust flow through an exhaust gas recirculation system, by adjusting airflow through a compressor recirculation valve, by adjusting fuel injection timing of a fuel injector, or by adjusting an area ratio of an exhaust gas recirculation mixer of the exhaust gas recirculation system, or by adjusting a combination thereof in response to variance in plurality of parameters. The parameters include quantity of exhaust emissions, a maximum in-cylinder pressure of the engine, an area ratio of an exhaust gas recirculation mixer of the exhaust gas recirculation system, estimated or sensed compressor surge, engine load, altitude of operation, or combinations of the parameters thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with the exemplary embodiments disclosed herein, a system and method of operating a turbocharged engine system having an exhaust gas recirculation system is disclosed. The system includes an exemplary controller configured to substantially eliminate surge of a compressor and reduce specific fuel consumption and exhaust emissions of an engine by adjusting exhaust flow through an exhaust gas recirculation system, by adjusting airflow through a compressor recirculation valve, by adjusting fuel injection timing of a fuel injector, or by adjusting a combination thereof in response to variance in a plurality of parameters. The parameters include quantity of exhaust emissions, a maximum in-cylinder pressure of the engine, an area ratio of an exhaust gas recirculation mixer of the exhaust gas recirculation system, estimated or sensed compressor surge, engine load, altitude of operation, or combinations of the parameters thereof.

Figure 1:
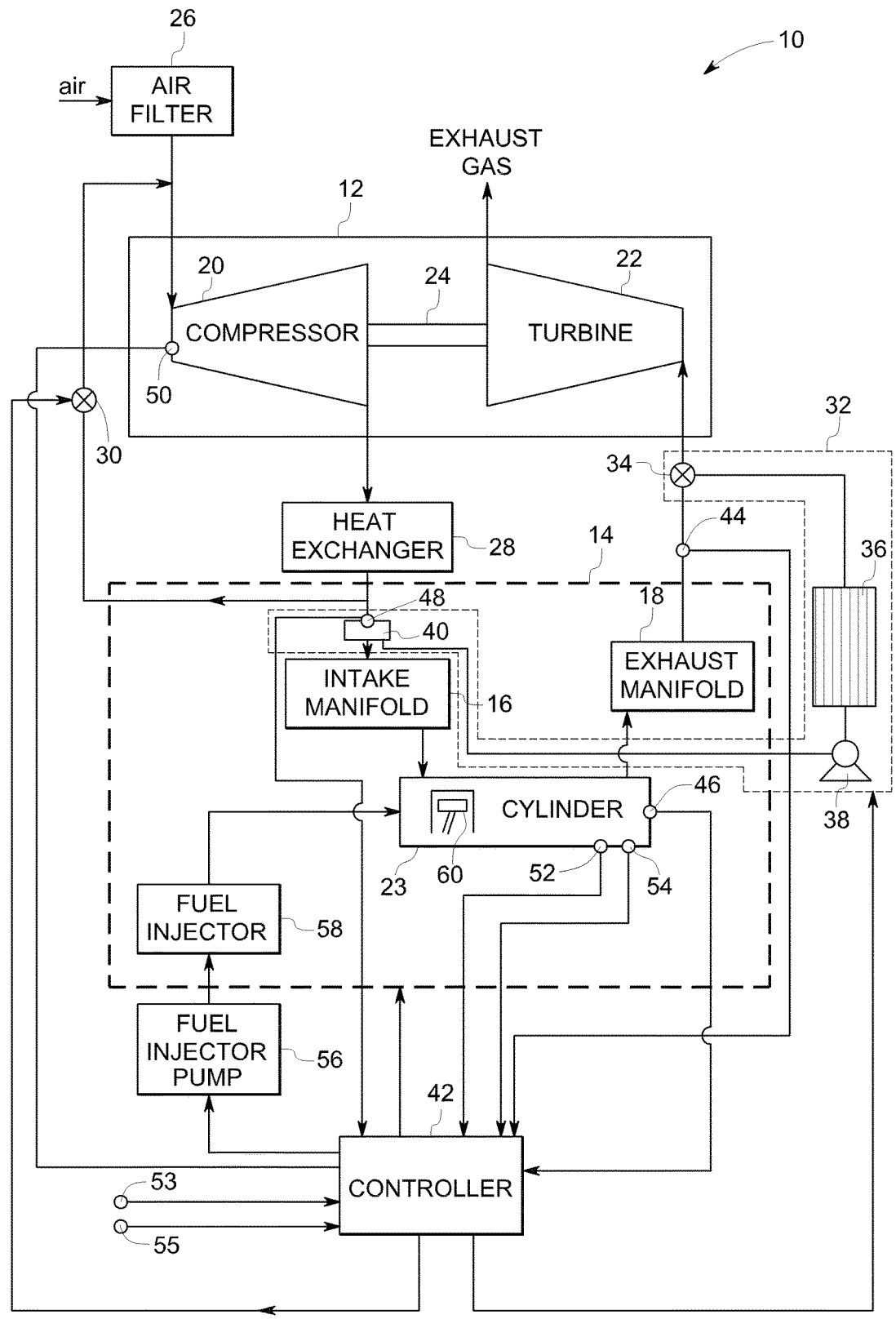
FIG. 1 is a diagrammatical representation of a turbocharged engine, such as a locomotive power unit, having surge elimination and exhaust emissions, specific fuel consumption control features in accordance with an exemplary embodiment of the present technique.

Referring to FIG. 1, a turbocharged engine system 10 having surge elimination, specific fuel consumption and exhaust emission control features is illustrated in accordance with certain embodiments of the present technique. The turbocharged engine system 10 includes a turbocharger 12 and a compression-ignition engine, e.g. diesel engine 14. As discussed in further detail below, embodiments of the present technique provide monitoring and control features, such as sensors and control logic, to control specific fuel consumption, exhaust emissions, and substantially eliminate compressor surge within the turbocharged engine system 10. For example, during conditions such as when there is increase in percentage of exhaust gas recirculation, a compressor surge is substantially eliminated and specific fuel consumption; exhaust emissions are reduced to acceptable/desirable levels through one or more control techniques discussed below.

The illustrated engine 14 includes an air intake manifold 16 and an exhaust manifold 18. The turbocharger 12 includes a compressor 20 and a turbine 22 and is operated to supply compressed air to the intake manifold 16 for combustion within a cylinder 23. The turbine 22 is coupled to the exhaust manifold 18, such that the exhaust gases expand through the turbine 22, putting work onto and rotating a turbocharger shaft 24 connected to the compressor 20. The compressor 20 draws ambient air through a filter 26 and provides compressed air to a heat exchanger 28. The temperature of air is increased due to compression through the compressor 20. The compressed air flows through the heat exchanger 28 such that the temperature of air is reduced prior to delivery into the intake manifold 16 of the engine 14. In one embodiment, the heat exchanger 28 is an air-to-water heat exchanger, which utilizes a coolant to facilitate removal of heat from the compressed air. In another embodiment, the heat exchanger 28 is an air-to-air heat exchanger, which utilize ambient air to facilitate removal of heat from compressed air.

In the illustrated embodiment, a recirculation valve 30 is provided to recirculate a desired amount of the airflow exiting from the heat exchanger 28 back through the compressor 20. In an alternative arrangement, air can be recirculated before entering the heat exchanger 28. As discussed below, the amount of air recirculation can be controlled based on various environmental and operating conditions, such that the engine performs within desired performance parameters. In addition, a desired amount of the engine exhaust from the exhaust manifold 18 is recirculated and mixed with airflow from the heat exchanger 28 via an exhaust gas recirculation system 32. The exhaust gas recirculation system 32 includes an exhaust gas recirculation valve 34, an exhaust gas recirculation cooler 36, a pump 38, and a mixer 40. As discussed below, the amount of exhaust by-passing can be controlled based on various environmental and operating conditions, such that the engine performs within desired performance parameters.

The system 10 also includes a controller 42. In one embodiment, the controller 42 is an electronic logic controller that is programmable by a user. In the illustrated embodiment, a plurality of sensors including an emission sensor 44, an in-cylinder pressure sensor 46, an EGR mixer throat-area sensor 48, a compressor surge sensor 50, an engine load sensor 52, altitude sensor, 53, an engine speed sensor 54, and an ambient temperature sensor 55 coupled to the controller 42 and configured to measure quantity of the exhaust emissions, the maximum in-cylinder pressure, area ratio of the exhaust gas recirculation system, compressor surge, engine load, altitude of operation, engine speed, and ambient temperature respectively. The controller 42 receives the corresponding output signals from the plurality of sensors 44, 46, 48, 50, 52, 53, 54, 55.

In one embodiment, the controller 42 is an electronic fuel injection controller for the engine 14. The controller 34 receives corresponding output signals from the sensors 44, 46, 48, 50, 52, 53, 54, 55 and may be operable to produce a timing signal to control operation of a plurality of fuel injection pumps 56. The pumps 56 drive a plurality of fuel injectors 58 for injecting fuel into the plurality of cylinders 23 of the engine 14. A piston 60 is slidably disposed in each cylinder 23 and reciprocates between a top dead center and a bottom dead center position.

In another embodiment, the controller 42 is a recirculation controller for the compressor 20. The controller 42 receives corresponding output signals from the sensors 44, 46, 48, 50, 52, 53, 54, 55 and may be operable to produce an output signal to control the recirculation valve 30 provided to recirculate a desired amount of the airflow exiting from the heat exchanger 28 back through the compressor 20. In yet another embodiment, the controller 42 is a recirculation controller for the engine 14. The controller 42 receives corresponding output signals from the sensors 44, 46, 48, 50, 52, 53, 54, 55 and may be operable to produce an output signal to control the exhaust gas recirculation system 32 provided to recirculate a desired amount of the engine exhaust from the exhaust manifold 18 and mix with airflow from the heat exchanger 28. In such an embodiments, the controller 42 controls the exhaust gas recirculation valve 34, an exhaust gas recirculation cooler 36, a pump 38, and an area ratio of the mixer 40, or combinations thereof.

In the illustrated embodiment, the controller 42 may further include a database, an algorithm, and a data analysis block (not shown). The database may be configured to store predefined information about the system 10. For example, the database may store information relating to emissions of the engine 14, in-cylinder pressure, area-ratio of the mixer 40, operating condition of the compressor 20, engine load, operating conditions of the engine 14, engine speed, or the like. Furthermore, the database may be configured to store actual sensed/detected information from the above-mentioned sensors. The algorithm facilitates the processing of signals from the above-mentioned plurality of sensors.

The data analysis block may include a range of circuitry types, such as a microprocessor, a programmable logic controller, a logic module, etc. The data analysis block in combination with the algorithm may be used to perform the various computational operations relating to determination of the amount of engine emissions, maximum in-cylinder pressure, area-ratio of the mixer 40, engine load, compressor surge, engine speed, and the ambient operating conditions. The controller 42 is configured to substantially eliminate surge of the compressor 20 and reduce specific fuel consumption and exhaust emissions of the engine 14 by adjusting exhaust flow through the exhaust gas recirculation system 32, by adjusting airflow through the compressor recirculation valve 30, by adjusting fuel injection timing of the fuel injector, or by adjusting a combination thereof in response to variance in the plurality of parameters discussed above.

Figure 2:
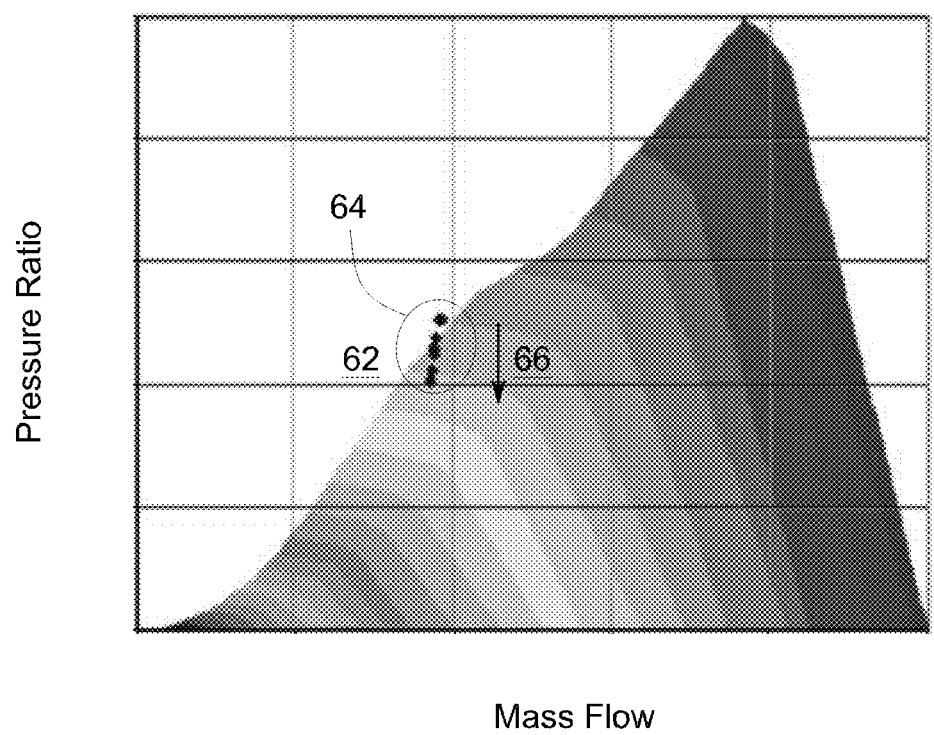
FIG. 2 is a compressor map illustrating a plurality of operating points in accordance with an exemplary embodiment of the present technique.

Referring to FIG. 2, a compressor map representing variation of air pressure ratio across the compressor 20 (represented by the Y-axis) relative to air mass flow rate across the compressor 20 (represented by the X-axis) is illustrated in accordance with embodiments of the present technique. The pressure ratio across the compressor 20 may be defined as the ratio of compressor outlet pressure to compressor inlet pressure.

In the illustrated compressor map, a region 62 on one side of stall points 64 generally illustrates a "surge region" and a region 66 on other side of the stall points 64 generally illustrates a "normal operating region" of the compressor 20. As discussed previously, exhaust gas recirculation is one of the potential ways to achieve low NOx emission levels. As the percentage of exhaust gas recirculation increases, lower NOx emission levels become achievable. In such a high-pressure exhaust gas recirculation system, the turbo compressor can surge in different situations. In one situation, as the percentage of exhaust gas recirculation increases, the fresh air needed by the engine reduces. This leads to a reduced mass flow across the compressor 20. As a result, an operating point of the compressor 20 is pushed to the region 62. This indicates that an operating point of the compressor 20 is in the surge region 62. In another situation, as the throat area of an exhaust gas recirculation mixer 40 decreases, the backpressure on the compressor 20 increases, leading to increase in the pressure ratio across the compressor. In such a situation, an operating point of the compressor 20 is pushed to the region 62 indicating that an operating point of the compressor 20 is in the surge condition.

In one embodiment, the controller 42 controls the compressor recirculation valve 30 to recirculate a desired amount of the airflow exiting from the heat exchanger 28 back through the compressor 20. As a result, airflow through the compressor is increased and pressure ratio across the compressor 20 is reduced and an operating point of the compressor is pushed to the region 66. This indicates that the compressor 20 is in the normal operating region. In another embodiment, the controller 42 controls the exhaust gas recirculation system 32 to reduce the percentage of exhaust gas recirculation from the exhaust manifold 18 to mix with airflow from the heat exchanger 28. In a specific embodiment, the controller 42 controls the exhaust gas recirculation valve 34, cooler 36, pump 38, or combinations thereof. As a result, airflow through the compressor is increased and pressure ratio across the compressor 20 is reduced and an operating point of the compressor is pushed to the region 66. This indicates that the compressor 20 is in the normal operating region. In another specific embodiment, the controller 42 increases an area ratio of the mixer 40. As a result, backpressure acting on the compressor 20 is reduced and subsequently pressure ratio across the compressor 20 is decreased. Again, this indicates that the operating point of the compressor 20 is in the normal operating region. As a result of these controlled adjustments, operation of the compressor 20 shifts from the surge region 62 to a normal operating region 66.

Figure 3:
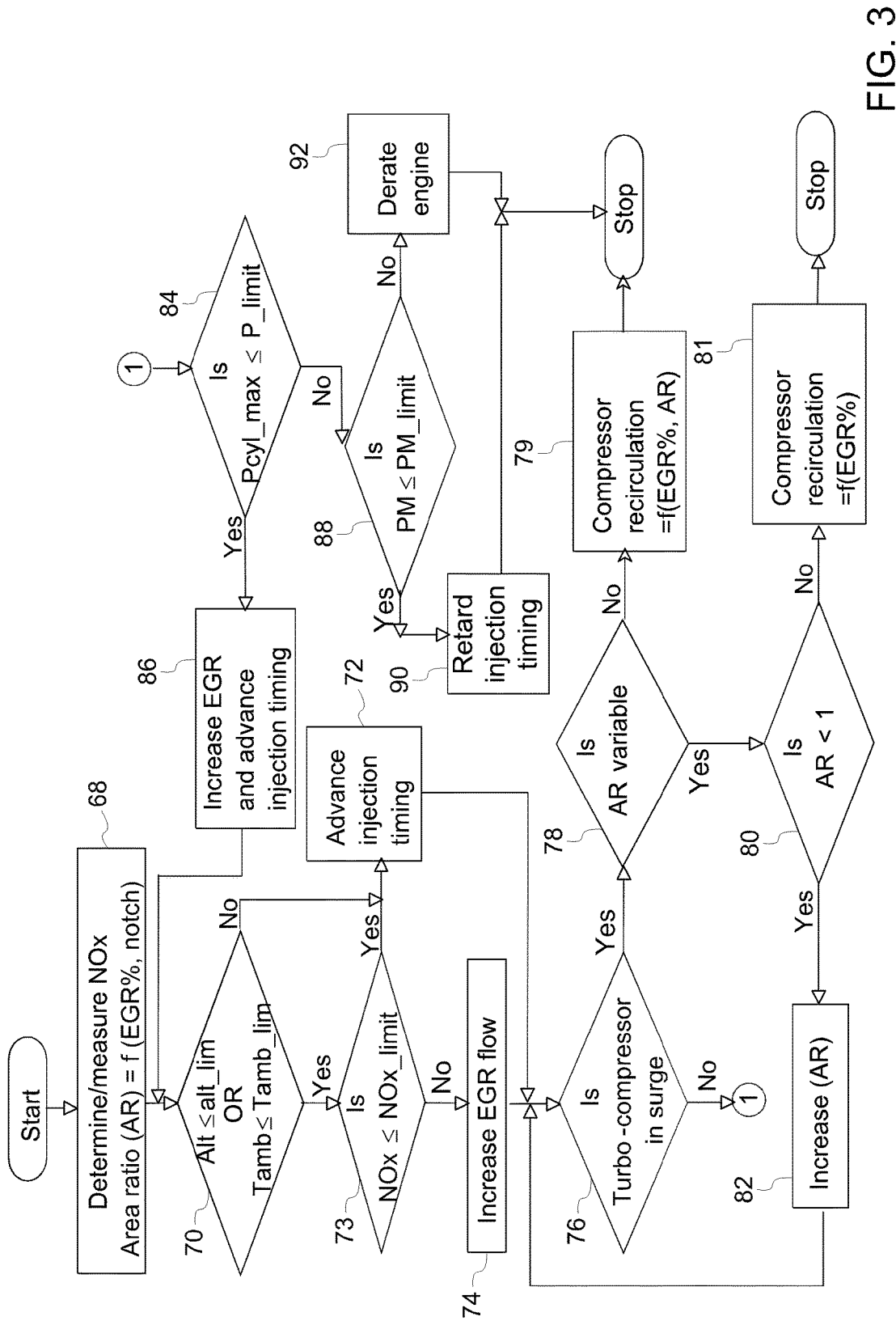
FIG. 3 is a flow chart illustrating exemplary steps involved in surge elimination and exhaust emissions, specific fuel consumption control features in accordance with an exemplary embodiment of the present technique.

Referring to FIG. 3, this figure is a flow chart illustrating one embodiment of the method of operating the turbocharged engine system 10 of FIG. 1. In the illustrated embodiment, the controller 42 receives the corresponding output signals from the plurality of sensors 44, 46, 48, 50, 52, 53, 54, 55. The controller 42 determines the amount of exhaust emissions exiting the exhaust manifold 18, area-ratio of the mixer 40 based on the percentage of exhaust gas recirculation through the exhaust gas recirculation system 32 and the engine operating notch as represented by the step 68. The exhaust emissions may include nitrogen oxide (NOx), particulate matter (PM), or the like. The "area ratio" may be defined as the ratio of throat area to pipe area of the mixer 40.

The controller 42 compares the measured operating altitude (Alt) to a predetermined altitude limit (alt_lim), or compares the measured ambient temperature (Tamb) to a predetermined ambient temperature (Tamb_lim) as presented by the step 70. If the measured operating altitude (Alt) is greater than the predetermined altitude limit (alt_lim), or if the measured ambient temperature (Tamb) is greater than the predetermined ambient temperature (Tamb_lim), then controller 42 produces a timing signal to control operation of a plurality of fuel injection pumps 56 so as to drive a plurality of fuel injectors 58 and advance the fuel injection timing as represented by the step 72. If the measured operating altitude (Alt) is less than or equal to the predetermined altitude limit (alt_lim), or if the measured ambient temperature (Tamb) is less than or equal to the predetermined ambient temperature (Tamb_lim), the controller 42 compares the amount of measured nitrogen oxide emissions (NOx) to a predetermined amount of nitrogen oxide emissions (NOx_lim) as represented by the step 73. If the amount of measured nitrogen oxide emissions (NOx) is less than or equal to the predetermined amount of nitrogen oxide emissions (NOx_lim), the controller 42 advances the fuel injection timing as represented by the step 72. If the amount of measured nitrogen oxide emissions (NOx) is greater than the predetermined amount of nitrogen oxide emissions (NOx_lim), then the controller 42 controls the exhaust gas recirculation system 32 to increase percentage of exhaust gas recirculation through the system 32 as represented by the step 74. In one specific embodiment, the controller 42 controls the exhaust gas recirculation valve 34, cooler 36, pump 38, or combinations thereof. In another specific embodiment, the controller 42 controls area-ratio of the mixer 40.

The controller 42 determines whether the compressor 20 is in surge condition as represented by the step 76. In other words, the controller 42 determines whether the compressor 20 is operation in the surge region 62 (illustrated in FIG. 2). If the compressor 20 is in surge condition, then the controller 42 checks whether the area-ratio (AR) of the mixer 40 is variable as represented by the step 78. If the area-ratio (AR) of the mixer 40 is not variable, the controller 42 controls the recirculation valve 30 to recirculate a desired amount of the airflow exiting from the heat exchanger 28 back through the compressor 20 as represented by the step 79. The amount of airflow recirculation is determined based on the percentage of exhaust gas recirculation through the recirculation system 32 and the area-ratio of the mixer 40. If the area-ratio (AR) of the mixer 40 is variable, then the controller 42 determines whether the area-ratio (AR) of the mixer 40 is less than one as represented by the step 80. If the area-ratio (AR) of the mixer 40 is less than one, then the controller 42 increases the area-ratio (AR) of the mixer 40 to control compressor surge as represented by the step 82. If the area-ratio (AR) of the mixer 40 is greater than one, the controller 42 controls the recirculation valve 30 to recirculate a desired amount of the airflow exiting from the heat exchanger 28 back through the compressor 20 as represented by the step 81.

If the compressor 20 is not in surge condition, then the controller 42 compares a measured maximum in-cylinder pressure (Pcyl_max) of the engine to a predetermined pressure limit (P_limit) as represented by the step 84. If the measured maximum in-cylinder pressure (Pcyl_max) is less than or equal to the predetermined pressure limit (P_limit), the controller 42 increases the percentage of exhaust gas recirculation through the exhaust gas recirculation system 32 and advances the fuel injection timing as represented by the step 86. If the measured maximum in-cylinder pressure (Pcyl_max) is greater than the predetermined pressure limit (P_limit), then the controller 42 compares amount of measure particulate matter (PM) to predetermined amount of particulate matter (PM_limit) as represented by the step 88. If the amount of measure particulate matter (PM) is less than or equal to predetermined amount of particulate matter (PM_limit), the controller 42 retards the fuel injection timing as represented by the step 90. If the amount of measure particulate matter (PM) is greater than the predetermined amount of particulate matter (PM_limit), the controller 42 derates the engine 14 as represented by the step 92.

In accordance with the embodiments above with reference to FIGS. 1-3, in one embodiment the air mass flow across the compressor needs to be increased to avoid surge. A particular amount of air is bypassed after the heat exchanger 28 and is re-circulated into the compressor 20. This ensures higher mass-flow rate across the compressor thus avoiding compressor surge. The amount of airflow to be re-circulated is a function of the percentage of exhaust gas recirculation at which the engine 14 is operating and the load-speed conditions. In another embodiment, initially, the amount of NOx emissions is determined and the area-ratio of the mixer 40 is adjusted based on the percentage of exhaust gas recirculation needed for the NOx emissions reduction and the engine notch position. Then the NOx emissions is decreased or increased to the desired regulation level through control of fuel injection timing and percentage of exhaust gas recirculation. In case of compressor surge, the area-ratio of the mixer 40 (AR), if it is variable, is increased until the compressor surge is eliminated or area-ratio of the mixer 40 reaches 1, whichever occurs earlier. If, in spite of increase in the area-ratio of the mixer 40, the compressor 20 surges, then compressor air flow recirculation is deployed. The airflow recirculation is a function of percentage of exhaust gas recirculation or a combination of percentage of exhaust gas recirculation and area-ratio of the mixer 40. Finally, maximum in-cylinder pressure is maintained within predetermined limits through control of fuel injection timing and percentage of exhaust gas recirculation as required.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a turbocharged engine system via a controller, comprising:
   determining via the controller a quantity of NOx emissions of an engine;
   determining via the controller an altitude of operation of the turbocharged engine system; and
   if the altitude of operation of the turbocharged engine system is less than or equal to a predetermined altitude limit, adjusting via the controller exhaust flow through an exhaust gas recirculation system in response to the quantity of NOx emissions, wherein adjusting exhaust flow through the exhaust gas recirculation system comprises controlling an exhaust gas recirculation valve and/or an exhaust gas recirculation pump.

2. The method of claim 1, further comprising comparing an ambient temperature of the turbocharged engine system to a predetermined ambient temperature limit.

3. The method of claim 2, further comprising advancing a fuel injection timing when the NOx emissions of the engine are less than or equal to the predetermined NOx emission limit.

4. The method of claim 1, further comprising advancing a fuel injection timing when the altitude of operation of the turbocharged engine system is greater than a predetermined altitude limit.

5. The method of claim 1, further comprising increasing the exhaust flow through the exhaust gas recirculation system when the NOx emissions of the engine are greater than a predetermined NOx emission limit.

6. The method of claim 1, further comprising determining whether a compressor of the turbocharged engine system is in a surge condition.

7. The method of claim 6, further comprising comparing a maximum in-cylinder pressure to a predetermined pressure limit when the compressor is not in the surge condition.

8. The method of claim 7, further comprising increasing a percentage of exhaust gas recirculation through the exhaust gas recirculation system and advancing fuel injection timing when the maximum in-cylinder pressure is less than or equal to the predetermined pressure limit.

9. The method of claim 7, further comprising comparing an amount of particulate matter in the exhaust emissions to a predetermined particulate matter limit when the maximum in-cylinder pressure is greater than the predetermined pressure limit.

10. The method of claim 9, further comprising retarding fuel injection timing when the amount of particulate matter in the exhaust emissions is less than or equal to the predetermined particulate matter limit.

11. The method of claim 9, further comprising derating the engine when the amount of particulate matter in the exhaust emissions is greater than the predetermined particulate matter limit.

12. A system, comprising:
   a controller coupled to an emission sensor, a pressure sensor, a surge sensor, a load sensor, an altitude sensor, a temperature sensor, and a speed sensor configured to measure a quantity of exhaust emissions of an engine, a maximum in-cylinder pressure, a compressor surge, an engine load, an altitude of operation, an ambient temperature, and an engine speed respectively;
   wherein the controller is configured to:
      determine the quantity of exhaust emissions, and the maximum in-cylinder pressure; and
      eliminate compressor surge and reduce specific fuel consumption and exhaust emissions of the engine by adjusting exhaust flow through the exhaust gas recirculation system in response to the quantity of exhaust emissions and the maximum in-cylinder pressure of the engine.

13. The system of claim 12, further comprising an exhaust gas recirculation valve, an exhaust gas recirculation cooler, and an exhaust gas recirculation pump, wherein the controller is configured to control the exhaust gas recirculation valve, the exhaust gas recirculation cooler, and the exhaust gas recirculation pump.

14. The system of claim 12, wherein the controller is configured to compare a sensed altitude of operation of the system to a predetermined altitude limit, or compare a sensed ambient temperature of the system to a predetermined ambient temperature limit.

15. The system of claim 14, wherein the controller is configured to compare the quantity of exhaust emissions of the engine to a predetermined exhaust emission limit when the sensed altitude of operation of the turbocharged engine system is less than or equal to the predetermined altitude limit, or the sensed ambient temperature of the system is less than or equal to the predetermined ambient temperature limit.

16. The system of claim 15, wherein the controller is configured to control a fuel injector to advance a fuel injection timing when the exhaust emissions of the engine are less than or equal to the predetermined exhaust emission limit, or when the sensed altitude of operation of the system is greater than the predetermined altitude limit, or the ambient temperature of the system is greater than the predetermined ambient temperature limit.

17. The system of claim 15, wherein the controller is configured to control the exhaust gas recirculation system to increase a quantity of exhaust flow through the exhaust gas recirculation system when the exhaust emissions of the engine is greater than the predetermined exhaust emission limit.

18. The system of claim 15, wherein the controller is configured to determine whether a compressor is in a surge condition.

19. The system of claim 18, wherein the controller is configured to compare the maximum in-cylinder pressure to a predetermined pressure limit when the compressor is not in the surge condition.

20. The system of claim 19, wherein the controller is configured to control the exhaust gas recirculation system to increase the exhaust flow through the exhaust gas recirculation system and a fuel injector to advance a fuel injection timing when the maximum in-cylinder pressure is less than or equal to the predetermined pressure limit.

21. The system of claim 19, wherein the controller is configured to compare a sensed amount of particulate matter in the exhaust emissions to a predetermined particulate matter limit when the maximum in-cylinder pressure is greater than the predetermined pressure limit.

22. The system of claim 21, wherein the controller is configured to control the fuel injector to retard a fuel injection timing when the sensed amount of particulate matter in the exhaust emissions is less than or equal to the predetermined particulate matter limit.

23. The system of claim 21, wherein the controller is configured to derate the engine when the sensed amount of particulate matter in the exhaust emissions is greater than the predetermined particulate matter limit.

24. The system of claim 12, further comprising a turbocharger coupled to the controller.

25. The system of claim 12, wherein the controller is coupled to the engine, wherein the engine is a compression ignition engine.

* * * * *